(12) United States Patent
De Jong (10) Patent No.: US 8,857,574 B2
(45) Date of Patent: Oct. 14, 2014

(54) DEVICE AND METHOD FOR BLOCKING A VEHICLE AND LOADING-UNLOADING STATION PROVIDED THEREWITH

(75) Inventor: Jurjen Jan De Jong, Kootstertille (NL)

(73) Assignee: Stertil B.V., Kootstertille (NL)

( * ) Notice: Subject to any disclaimer, the term of this patent is extended or adjusted under 35 U.S.C. 154(b) by 601 days.

(21) Appl. No.: 13/070,721

(22) Filed: Mar. 24, 2011

(65) Prior Publication Data

US 2011/0233006 A1 Sep. 29, 2011

(30) Foreign Application Priority Data

Mar. 29, 2010 (NL) ...................................... 2004466

(51) Int. Cl.
*B60T 3/00* (2006.01)
*B65G 69/00* (2006.01)
(52) U.S. Cl.
CPC .................................... *B65G 69/005* (2013.01)
USPC ............................................ 188/32; 414/401
(58) Field of Classification Search
USPC ..................... 188/32; 414/401, 396
See application file for complete search history.

(56) References Cited

U.S. PATENT DOCUMENTS

| 4,207,019 | A | * | 6/1980 | Cone | 414/373 |
| 6,276,496 | B1 | * | 8/2001 | Hageman et al. | 414/401 |
| RE37,570 | E | * | 3/2002 | Springer et al. | 414/401 |
| 6,368,043 | B1 | * | 4/2002 | Leum et al. | 414/401 |
| 6,589,003 | B2 | * | 7/2003 | Berends | 414/401 |
| 6,773,221 | B2 | * | 8/2004 | Belongia et al. | 414/401 |
| 2001/0026751 | A1 | * | 10/2001 | Berends | 414/400 |

FOREIGN PATENT DOCUMENTS

| EP | 0684915 B1 | 8/2001 |
| EP | 1120371 A1 | 8/2001 |

\* cited by examiner

*Primary Examiner* — Bradley King
(74) *Attorney, Agent, or Firm* — The Webb Law Firm (57) ABSTRACT

Disclosed are a device and method for blocking a vehicle, and a loading-unloading station provided with such a device. The device includes a guide track disposed along a driveway; a carriage guided by the guide track and provided with a blocking means for blocking a wheel of a vehicle; a locking member provided on the carriage for locking the carriage releasably relative to the guide track; displacing means for displacing the carriage from a first rest position for the blocking means to a second blocking position, wherein the displacing means are provided with an energy storage system such that energy supplied by the vehicle can be used to displace the carriage; and releasing means operatively connected to the displacing means for releasing the carriage such that it follows a wheel of a vehicle as soon as this passes the first position.

13 Claims, 6 Drawing Sheets

DEVICE AND METHOD FOR BLOCKING A VEHICLE AND LOADING-UNLOADING STATION PROVIDED THEREWITH

The present invention relates to a device for blocking a vehicle such as a truck. Such a device is used particularly to block a truck during loading and unloading thereof, for instance at a distribution centre.

Devices for blocking trucks are per se known and are for instance described in EP 1 120 371 and EP 0 684 915. The blocking device known herefrom makes use of a chain drive to displace a carriage over a guide track. As soon as the truck is positioned correctly relative to the loading-unloading station a blocking means is extended and/or displaced in order to hold the rear wheel of the truck therewith and make driving or rolling away impossible. Such blocking devices are relatively complex due to the number of parts required, and particularly the drives required.

The present invention has for its object to obviate or at least to reduce the above stated problems with devices for blocking a vehicle.

The present invention provides for this purpose a device for blocking a vehicle, comprising
 a guide track disposed along a driveway;
 a carriage guided by the guide track and provided with a blocking means for blocking a wheel of a vehicle;
 a locking member provided on the carriage for locking the carriage releasably relative to the guide track;
 displacing means for displacing the carriage from a first rest position for the blocking means to a second blocking position, wherein the displacing means are provided with an energy storage system such that energy supplied by the vehicle can be used to displace the carriage; and
 releasing means operatively connected to the displacing means for releasing the carriage such that it follows a wheel of a vehicle as soon as this passes the first position.

A guide track according to the invention is for instance disposed along a driveway of, among others, a loading-unloading station of for instance a distribution centre where a truck is reverse parked along the guide track for the purpose of loading and unloading. The device is provided with a carriage which is displaceable relative to the guide track such that the carriage can follow a moving truck. Provided on the carriage is a locking member with which the carriage can be releasably locked relative to the guide track. The locking member preferably engages directly on the guide track. It is however also possible for the locking member to engage on for instance a ground surface on which the guide track is placed. The carriage is in this way also locked relative to the guide track. Using the displacing means the carriage can be carried from a first rest position, in which blocking of the vehicle is realized, to a second blocking position in which it is possible, after locking of the carriage relative to the guide track, to block the vehicle such that it is held stationary at the desired position. The displacing means further enable a reverse movement of the carriage after unlocking in the second blocking position, such that the carriage returns to the first rest position. The vehicle can hereby leave said position by driving away from the blocking device. In the blocking position the blocking means, which is provided on the carriage guided by the guide track, preferably engages on the rear wheel of a vehicle which is moving backwards relative to the device. This blocking means is preferably takes the form of a type of rod extending substantially in a direction away from the longitudinal direction of the guide track such that no rotating or folding movement need be performed to carry the blocking means to the activated and blocking position in which the vehicle is held fast.

According to the invention the displacing means are provided with an energy storage system such that energy supplied by the vehicle can be used to displace the carriage. Energy supplied by the vehicle during movement thereof along the guide track is stored by this energy storage system such that it becomes available for the purpose of displacing the carriage. No additional energy provision and associated coupled drive need hereby be provided for the purpose of displacing such a carriage. The complexity of the device according to the invention is hereby greatly reduced. This results in an advantageous blocking device which requires less maintenance, fewer materials and production time and/or is more reliable.

Such a stated energy storage system can for instance be formed by increasing the potential energy of a mass while a truck moves away from the second blocking position. As soon as a subsequent truck reports in and reverses along the guide track, this stored potential energy can be utilized to displace the carriage as soon as preferably a rear wheel of a vehicle has passed the first rest position of the blocking means.

It is also possible to provide the energy storage system as a spring which can be tensioned in similar manner. It will be apparent to the skilled person that other embodiments of the energy storage system according to the invention are also possible.

An additional advantage of storing energy when the vehicle moves away is that the subsequent vehicle does not itself need to push forward a carriage or other type of construction. Such a construction has the drawback that, in the case the truck is for instance placed slightly askew relative to the guide track, the mechanism can be pressed out of alignment whereby it begins to malfunction. This can also cause problems since the vehicle must regularly manouevre to some extent close to a loading-unloading station, where a blocking device according to the present invention is placed, and so also moves forward a short distance here during positioning. A further additional problem of such a mechanism is that it is possible in the case of for instance a slippery surface as a result of frost and/or oil, or as a result of obstacles such as cans and branches, that such a mechanism slips, or even that the vehicle is pushed over the mechanism and thereby causes damage thereto.

The drive preferably comprises a flexible member which is preferably a steel cable. By providing a flexible member, and in particular a steel cable, a flexible drive is obtained wherein it is possible to incorporate the drive in the guide track. An efficient and safe device is hereby realized according to the invention. In addition, incorporating the drive at least partially in a guide track prevents fouling being able to accumulate in the drive and adversely affecting operation. Due to the flexible character it is possible to use running wheels or reversing wheels in the device. In the case a steel cable is provided, it can be incorporated in for instance the guide track in a number of paths or turns using such running wheels or reversing wheels. This has the advantage that no chain, chain drive and toothed wheels are necessary, these being relatively expensive, susceptible to fouling and therefore requiring maintenance. A further advantage is the possibility of providing the drive in compact manner in relatively simple and efficient manner. By providing the drive as a pulley construction using the running wheels or reversing wheels in for instance the guide track, the turn which the carriage can make can be increased in relatively simple manner. Ratios of 2:1, 3:1 or 4:1 can be realized here in relatively simple manner.

This ratio relates to the distance travelled by the carriage over the guide track, for instance amounting to 3 to 4 meters in relation to the turn which has to be performed with the drive and which can remain limited to for instance 1 meter due to the pulley action as described above.

In an advantageous preferred embodiment according to the present invention the displacing means comprise a drive operatively connected to the energy storage system for carrying the carriage from the first to the second position.

By providing the displacing means with a drive which is operatively connected to the energy storage system the carriage can be moved, at a desired moment and without addition of external energy, from the first rest position of the blocking means to the second blocking position in which the blocking means engages on a wheel of for instance a truck. A self-operating blocking device can be realized by providing this drive with the necessary energy from the energy storage system.

In an advantageous preferred embodiment of the present invention the vehicle charges the energy storage system as it drives away after the blocking is released. Through charging of the energy storage system by the released vehicle as it drives away from the loading-unloading position this energy can be used for a subsequent truck being positioned at the desired location. This has the advantage that this vehicle does not itself have to provide the required energy as it drives in, which would result in the above stated problems in respect of such a mechanism.

In an advantageous preferred embodiment according to the present invention the energy storage system comprises a telescopic spring.

Providing a telescopic spring makes is possible in effective manner to store energy which is released in a desired manner and at any desired moment for the movement of the carriage relative to the guide track. The telescopic spring is preferably extended when a truck moves away, and in this way as it were loaded. As soon as a subsequent truck passes the first position, the telescopic spring is released such that the carriage with the blocking means will follow the truck to the second blocking position. The use of a telescopic spring has the additional advantage that it can be incorporated in the guide track such that a safe construction is obtained which is also protected from for instance fouling.

In a further advantageous preferred embodiment of the present invention the locking member engages in a locked position on engaging means provided in or close to the guide track.

The locking of the carriage is realized by an engagement, preferably on the guide track. It is also possible to have such a locking engage on for instance the ground surface. A fixing of the carriage relative to the guide track is realized in both cases. A locking is preferably made possible in both positions, i.e. the first rest position for the blocking means, wherein the blocking means is preferably situated on the front side or the entry side of the blocking device, and the second blocking position in which a truck is standing ready for loading and/or unloading thereof and must be held fast. In an advantageous embodiment the engaging means are embodied as a toothed track provided in the guide track. The locking member is provided here with teeth which drop into the teeth of the toothed track. By providing the toothed track over substantially the whole length of the guide track it is possible to activate the locking at any desired position of the truck relative to the guide track. This achieves that any type of truck or other vehicle occurring in practice can be blocked, irrespective of the specific dimensions.

The locking member is preferably provided with an evolvent, self-releasing toothing. Such a toothing realizes on the one hand a good transmission of forces whereby the locking is effected, and achieves on the other that during unlocking these teeth can be released from each other in relatively simple manner without this requiring a particularly great effort. The user-friendliness and the reliability of the device are hereby further improved.

The locking member is preferably operatively connected to an actuator for the purpose of activating and/or deactivating the locking. By providing an actuator the locking can be set into operation or, conversely, released at any desired moment. The locking is preferably operated by a user or manager of the associated loading-unloading station where the blocking device is provided. This further increases safety.

The locking member preferably comprises an additional telescopic spring. In the case the locking member is activated, preferably by the actuator, in an advantageous preferred embodiment the additional telescopic spring will slacken and thereby bring about the locking. Using the actuator the telescopic spring can be re-tensioned such that the locking is released. A locking is hereby made possible in relatively simple manner. The operation of tensioning and slackening can of course also be applied in reverse.

In an advantageous preferred embodiment according to the present invention the device comprises a fixation means in the first position of the carriage for fixing the blocking means in this position.

The fixation means is for instance a plate and/or recess in the ground surface in which the blocking means can be placed in the first position. This fixation means is embodied here such that the vehicle passes the blocking means in a backward movement during positioning of for instance the truck relative to the loading-unloading position.

The fixation means preferably comprises sensor means for detecting a wheel of the vehicle and travel direction thereof. Use is for instance made here of two pressure sensors provided close to the blocking means. Due to the load of for instance the rear wheel of a truck it is possible to detect that such a truck is moving backward relative to the blocking device. The carriage is then unlocked such that it can follow the vehicle to the second position.

The fixation means preferably also comprises a detection system for detecting the blocking means. Using the detection system it is possible to determine whether a blocking means is situated in the relevant recess of the fixation means. This is relevant for instance since most vehicles are provided with a plurality of wheels which pass the fixation means in succession. In this way it is possible to determine whether the carriage has to be released in order to follow the desired wheel.

The present invention further relates to a loading-unloading station provided with a device as described above. Such a loading-unloading station provides the same effects and advantages as described in respect of the device.

The present invention further also relates to a method for blocking a vehicle in a desired position, comprising of providing a device as described above. Such a method also provides the same effects and advantages as described in respect of the device.

Further advantages, features and details of the invention are elucidated on the basis of preferred embodiments thereof, wherein reference is made to the accompanying drawings, in which.

A loading-unloading location 2 (FIG. 1) is provided in a building 4. Each loading-unloading location 2 is provided with an opening or door 6 and a so-called dock shelter 8 for protection thereof. A truck 10 is reversed into loading-unloading location 2, inter alia with rear wheels 12. Truck 10 moves here substantially parallel to blocking device 14.

Figure 2A:
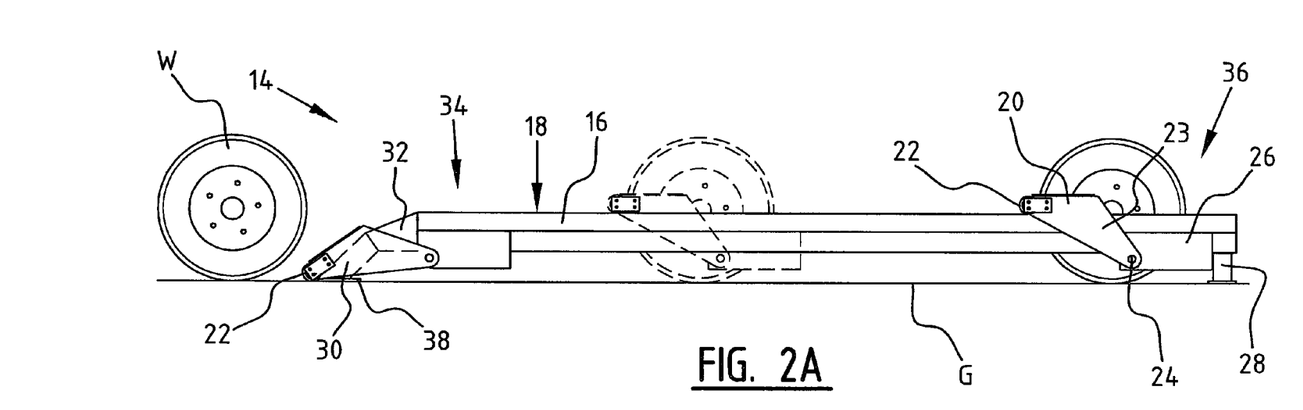
FIGS. 2A and B show views of a first embodiment of the device according to the invention.
Figure 2B:
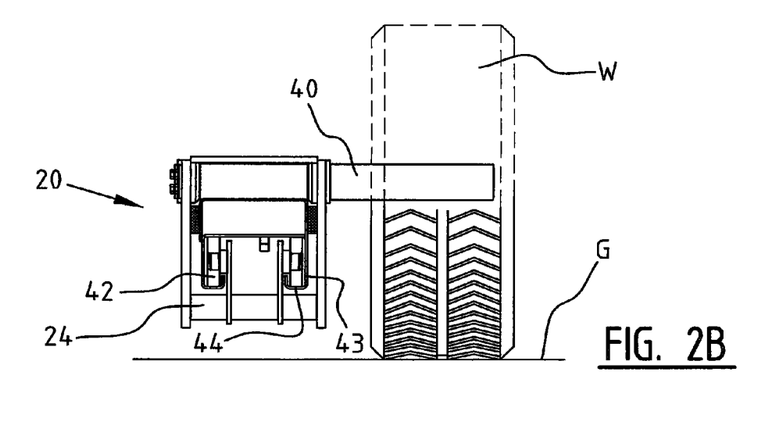

Blocking device 14 (FIGS. 2A and B) is provided with a guide track 16 on which a guide surface or guide rail 18 is provided, over which a carriage 20 with wheels 22 can be displaced. Carriage 20 comprises an outer part 23 which is connected by connecting shaft 24 to movable housing 26. Guide track 16 is placed on a ground surface 6 using uprights 28. On the front side guide track 16 is provided with a first obliquely placed guide piece 30 and a second part 32. Carriage 20 can be placed in a first rest position 34 and a second blocking position 36. In rest position 34 of carriage 20 a ground plate 38 is provided over which a wheel W can be moved. Carriage 20 is provided with a blocking rod 40. Carriage 20 is moved forward using running wheels 42 in a bent edge 44 of side edge 43 of guide track 16.

In the shown embodiment guide track 16 is provided along a length of about 3 to 3.5 meters and the top side of guide track 16 is situated at a height of about 35 to 40 cm relative to ground surface 30.

Figure 3A:
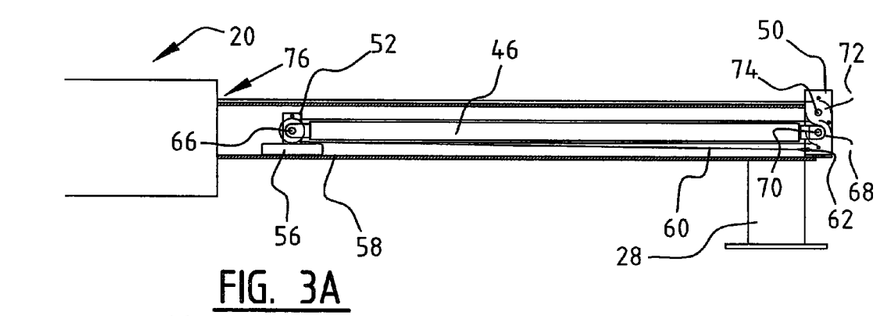
FIGS. 3A-C show views of details of the device of FIG. 2.
Figure 3B:
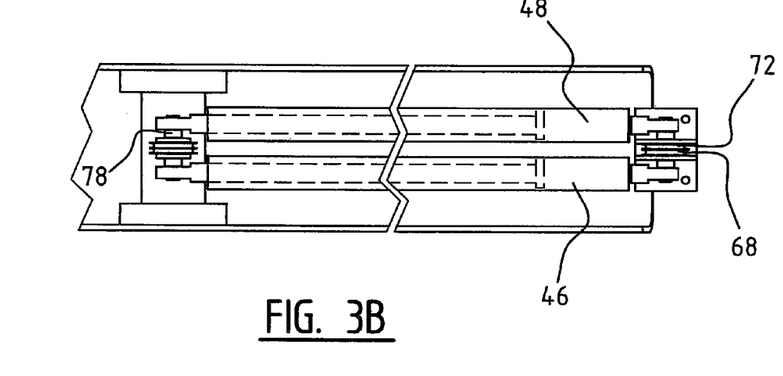
Figure 3C:
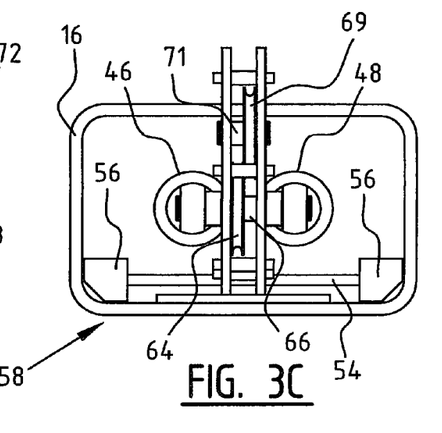

In the shown embodiment two telescopic springs 46, 48 (FIGS. 3A, B and C) are provided on the inner side of guide track 16. At a first outer end telescopic springs 46, 48 are connected to fixed support 50. In the shown embodiment fixed support 50 is situated closest to opening 6 of loading-unloading position 2. The other outer end of telescopic spring 46, 48 is connected to a movable support 52 which is connected to a slide guide or slide block 56 using connection 54. Slide block 56 moves over slide surface 58, which in the shown embodiment is provided on the inner side of guide track 16. Further provided is a steel cable 60 is which is connected at a first outer end to a fixed point 62, in the shown embodiment located close to fixed support 50. From this fixed point 62 steel cable 60 runs to a first running wheel 64 at the other outer end of telescopic spring 46, 48, wherein a shaft 66 is provided. Steel cable 60 also runs back in the direction of fixed support 50 to second running wheel 68 provided on shaft 70, and further to third running wheel 69 on shaft 71. From here steel cable 60 returns to fourth running wheel 72 on shaft 74. From there the steel cable runs back again to the front side of guide track 16 and is there connected to fixed point 76 on carriage 20. In the shown embodiment four turns are therefore made with steel cable 60. This means that a displacement of carriage 20 through a distance of 4 meters results in the telescopic spring extending through a length of 1 meter. The desired pulley action is realized in this way by using running wheels 64, 68, 69 and 72. Provided in the shown embodiment are two telescopic springs 46, 48 which are mutually connected using a spacing sleeve 78. Also provided in the shown embodiment are two slide blocks 56 which are mutually connected by connection 54.

Figure 4A:
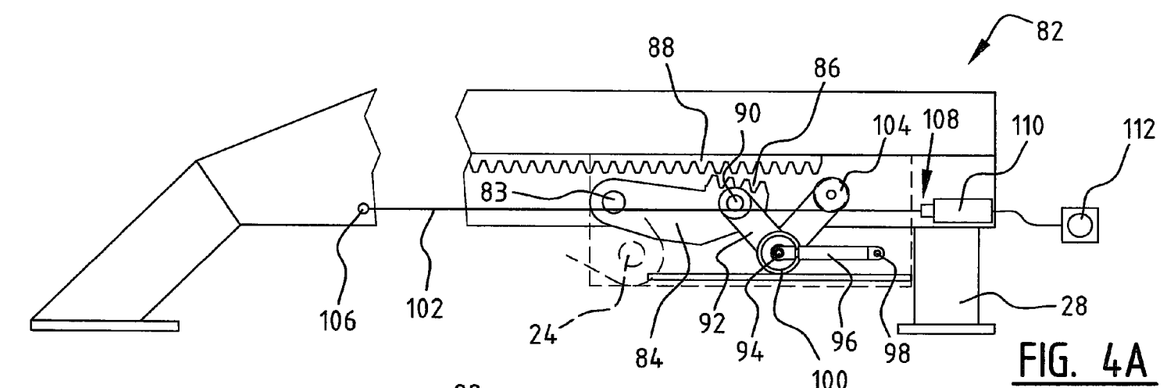
FIGS. 4A-D show a view of the locking of the device of FIG. 2 in two embodiments.
Figure 4B:
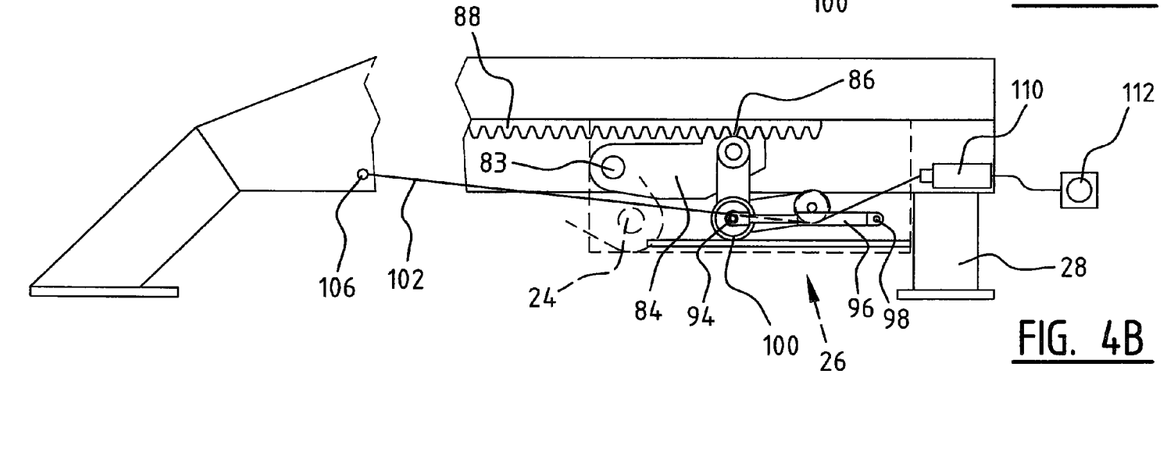

A lock or securing 82 (FIG. 4) locks carriage 20 relative to guide track 16. A shaft 83 is provided for this purpose on carriage 20. A lever 84 is mounted rotatably on shaft 83. The other outer end of lever 84 is provided with an evolvent toothing 86 which can engage in a toothed track 88 which in the shown embodiment extends over substantially the whole length of guide track 16. At the outer end with toothing 86 lever 84 is provided with a movable shaft 90 on which is mounted an arm 92. The other outer end of arm 92 is connected to an outer end 94 of a telescopic spring 96. The other outer end of telescopic spring 96 is connected to a fixed point 98. Situated on outer end 94 is a running wheel 100 around which in the shown embodiment steel cable 102 is fastened. Steel cable 102 runs further to a second running wheel 104. At the first outer end steel cable 102 is connected to a fixed point 106 on the front side of guide track 16 and at the other outer end it is connected to a fixed point 108 on the side of the opening of loading-unloading location 4. Provided at this fixed point 108 is an actuator 110 which is operated using control box 112. In the shown embodiment actuator 110 is a 24V direct current actuator. After operation from control box 112, actuator 110 is activated for the purpose of locking the lock or securing 82, wherein steel cable 102 is slackened to some extent. In the shown embodiment telescopic spring 96 will hereby slacken and extend to some extent, whereby in the shown embodiment arm 92 is moved forward from outer end 94. Movable shaft 90 is hereby lifted such that lever 84 with toothing 86 is moved upward and engages in toothed track 88 so as to thereby realize the locking. When the locking has to be uncoupled, actuator 110 can be activated from control box 112 by tightening steel cable 102 such that telescopic spring 96 is retracted and outer end 94 moves to the right in the shown embodiment such that arm 92 with movable shaft 90 will move downward, so that toothing 86 is released from toothed track 88. Owing to the construction with steel cable 102 over substantially the whole length of guide track 16 the locking 82 can be activated at any desired position over substantially the whole length of guide track 16.

Figure 4C:
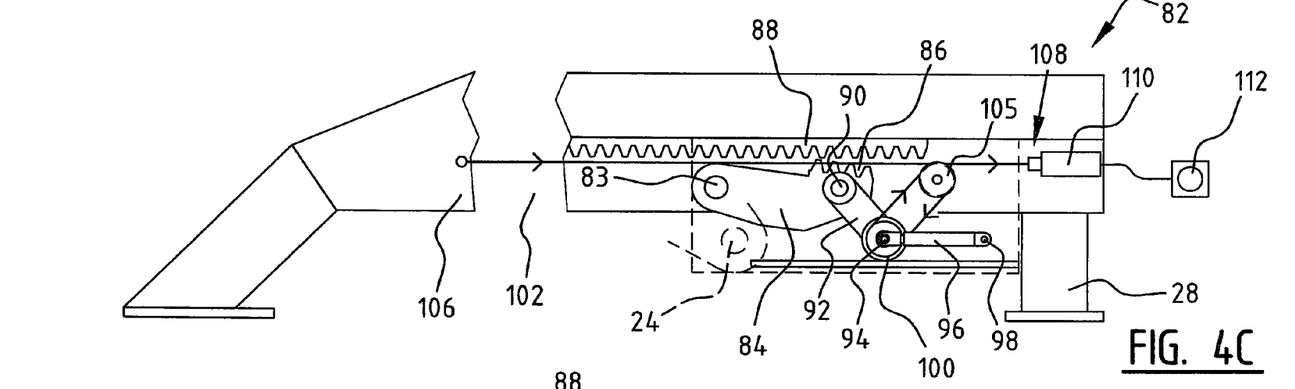
Figure 4D:
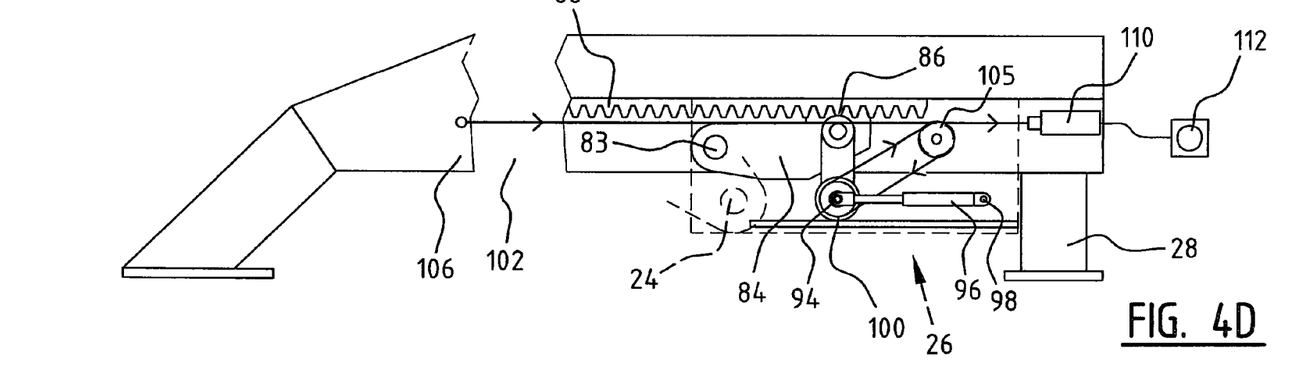

Second running wheel 104 is embodied as a double cable pulley 105 (FIGS. 4C and D) provided at a fixed position. This fixed position for pulley 105 is maintained in both the locked and unlocked position of the blocking device.

In an alternative embodiment for blocking device 114 (FIG. 5) use is made of substantially the same parts as for the above discussed embodiment. A difference is that housing 26 is provided on the outer side of guide track 16 instead of in the interior thereof.

Figure 5:
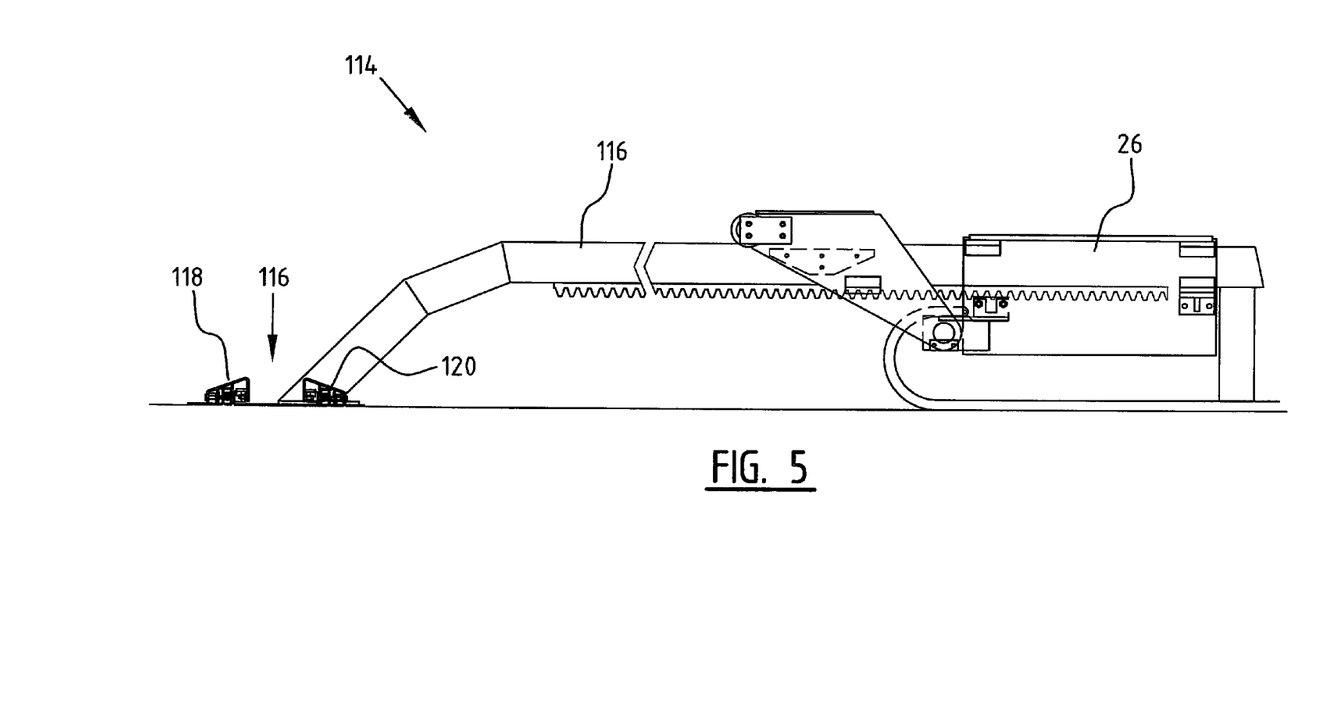
FIG. 5 shows an alternative embodiment of the device according to the invention.

In both embodiments of blocking device 14, 114 a blocking means 40 can be placed close to ground plate 38 in a recess 116. In the shown embodiment ground plate 38 is provided with a first sensor 118 and second sensor 120 for detecting passage of a wheel and the associated direction of travel. Also provided in the shown embodiment is a presence sensor 122 for detecting blocking means 40.

Figure 1:
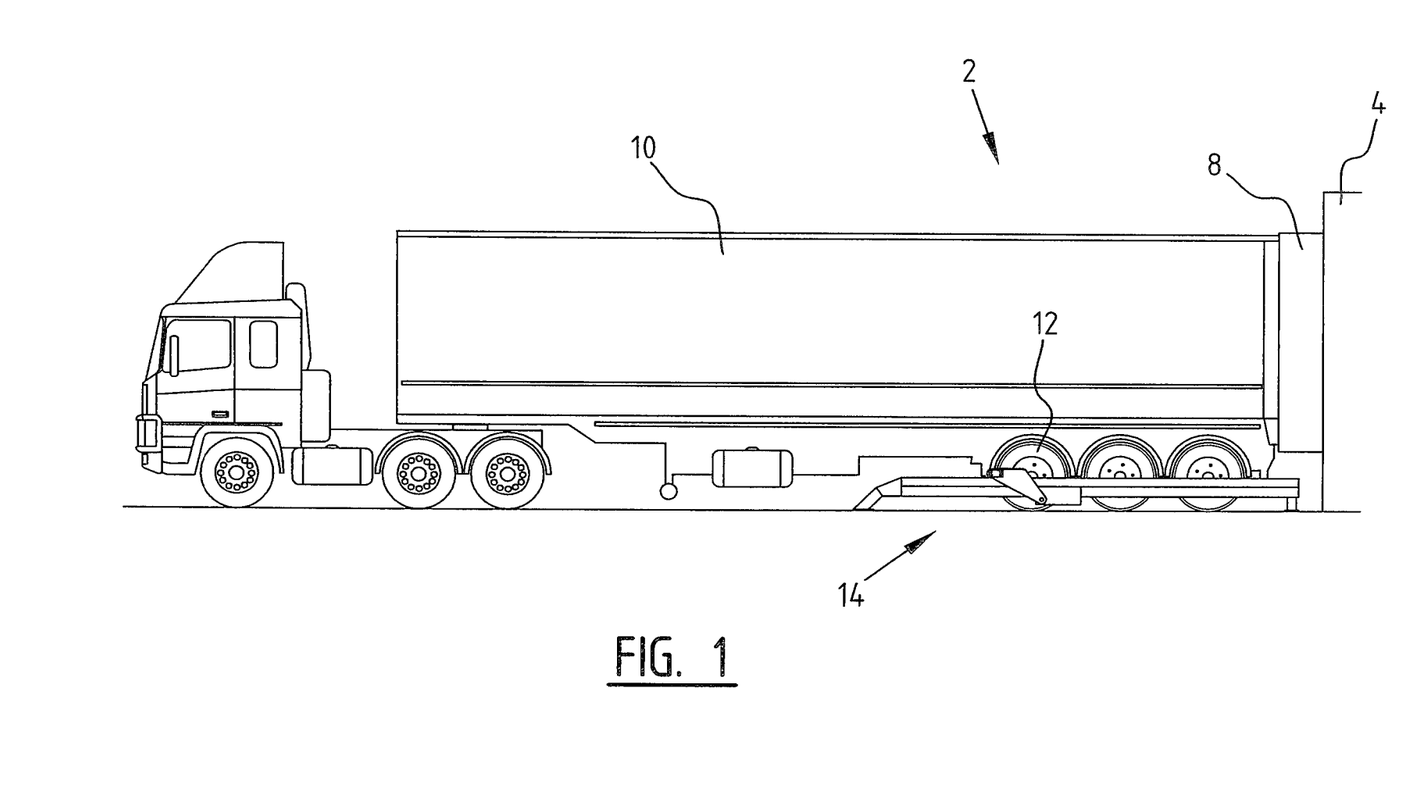
FIG. 1 shows a view of a loading-unloading station at a distribution centre.

When a truck has to be positioned close to opening 6 of loading-unloading location 2, it will move first with rear wheel 12 over ground plate 38 in backward direction. The passage of rear wheel 12 is detected using sensors 118, 120, after which carriage 20 is released using sensor 122 if blocking rod 40 is present in recess 116, and will follow this wheel 12 in the direction of opening 6. Through release of carriage 20 telescopic springs 46, 48 will be retracted such that steel cable 60 is pulled and carriage 20 is pulled back and thereby follows wheel 12. After reaching the desired loading-unloading position for truck 10, locking 82 is activated in the above described manner using control button 112. Once loading and/or unloading has been wholly completed, locking 82 is uncoupled in the likewise described manner, and truck 10 can move forward along guide track 16. Carriage 20 is pushed forward here such that telescopic springs 46, 48 are extended and thereby as it were tensioned. After truck 10 has reached front side 30 of guide track 16, blocking rod 40 is pressed into recess 116 of ground plate 138. Energy is hereby stored in telescopic springs 46, 48 and is ready for use with a subsequent truck 10.

The present invention is by no means limited to the above described preferred embodiments thereof. The rights sought are defined by the following claims, within the scope of which many modifications are possible. One possibility is thus to provide guide track 16 at an angle over substantially the whole length thereof. This further simplifies driving in of truck 10. It is further possible to have blocking means 40 engage just above the axle of truck 10 in order to thereby obtain an anti-theft effect. If an attempt is made to drive truck 10 away from loading-unloading position 2 when locking 82 is activated, the wheel will as it were pull itself under blocking means 40 and become jammed. Theft of truck 10 is hereby prevented.

It will also be apparent to the skilled person that diverse mechanical reversals are possible within the scope of protection of the present invention. This relates for instance to the tensioning and slackening of said telescopic springs.

The invention claimed is:

1. A device for blocking a vehicle, comprising:
   (a) a guide track disposed along a driveway;
   (b) a carriage guided by the guide track and provided with a blocking means for blocking a wheel of a vehicle;
   (c) a locking member provided on the carriage for locking the carriage releasably relative to the guide track;
   (d) displacing means for displacing the carriage from a first rest position for the blocking means to a second blocking position, wherein the displacing means are provided with an energy storage system such that energy supplied by the vehicle can be used to displace the carriage, wherein the displacing means comprise a drive operatively connected to the energy storage system for carrying the carriage from the first to the second position; and
   (e) releasing means operatively connected to the displacing means for releasing the carriage such that the carriage follows a wheel of a vehicle as soon as the wheel passes the first position,
   wherein the vehicle charges the energy storage system as the vehicle drives away after the blocking is released, whereby the energy supplied by the vehicle is available for a subsequent vehicle positioned at the guide track.

2. The device as claimed in claim 1, wherein the drive comprises a flexible member.

3. The device as claimed in claim 2, wherein the flexible member is a steel cable.

4. The device as claimed in claim 1, wherein the energy storage system comprises a telescopic spring.

5. The device as claimed in claim 1, wherein the locking member engages in a locked position on engaging means provided in or close to the guide track.

6. The device as claimed in claim 5, wherein the locking member includes an evolvent toothing adapted to engage a toothed track on the guide track.

7. The device as claimed in claim 1, wherein the locking member is operatively connected to an actuator for the purpose of activating and/or deactivating the locking.

8. The device as claimed in claim 1, wherein the locking member comprises a telescopic spring.

9. The device as claimed in claim 1, further comprising a sensor means in the first position of the carriage for fixing the blocking means in the first position.

10. The device as claimed in claim 9, wherein the fixation means comprise sensor means for detecting a wheel and travel direction thereof.

11. The device as claimed in claim 9, wherein the fixation means comprise a detection system for detecting the blocking means.

12. A loading-unloading station provided with a device as claimed in claim 1.

13. A method for blocking a vehicle in a desired position, comprising providing a device as claimed in claim 1.

\* \* \* \* \*